(12) United States Patent
Croak et al.

(10) Patent No.: US 7,978,601 B1
(45) Date of Patent: Jul. 12, 2011

(54) METHOD AND APPARATUS FOR NETWORK PERFORMANCE ANALYSIS

(75) Inventors: Marian Croak, Fair Haven, NJ (US); Hossein Eslambolchi, Los Altos Hills, CA (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 1688 days.

(21) Appl. No.: 10/994,583

(22) Filed: Nov. 22, 2004

(51) Int. Cl.
*H04J 1/16* (2006.01)

(52) U.S. Cl. ......... 370/230; 370/229; 370/235; 370/242

(58) Field of Classification Search .................. 370/352, 370/252, 395.21, 248, 356, 242, 229, 230, 370/235
See application file for complete search history.

(56) References Cited

U.S. PATENT DOCUMENTS

| | | | | |
|---|---|---|---|---|
| 5,042,027 A * | 8/1991 | Takase et al. | ................. | 370/252 |
| 6,046,988 A * | 4/2000 | Schenkel et al. | ............. | 370/254 |
| 6,856,676 B1 * | 2/2005 | Pirot et al. | ............... | 379/201.01 |
| 6,928,472 B1 * | 8/2005 | Wen | ............................... | 709/223 |
| 6,965,597 B1 * | 11/2005 | Conway | ........................ | 370/389 |
| 6,975,963 B2 * | 12/2005 | Hamilton et al. | ............. | 702/182 |
| 7,209,473 B1 * | 4/2007 | Mohaban et al. | ............. | 370/352 |
| 7,283,519 B2 * | 10/2007 | Girard | ........................... | 370/353 |
| 7,339,891 B2 * | 3/2008 | Binder et al. | ................. | 370/231 |
| 7,433,315 B2 * | 10/2008 | Bhatia et al. | .................. | 370/237 |
| 7,623,463 B2 * | 11/2009 | Chavda | ......................... | 370/241 |
| 7,774,440 B1 * | 8/2010 | Bagrodia et al. | ............. | 709/221 |
| 2003/0061017 A1 * | 3/2003 | Dotaro et al. | ................... | 703/14 |
| 2003/0202507 A1 * | 10/2003 | Nishida et al. | ................ | 370/352 |
| 2003/0235280 A1 * | 12/2003 | Shafie-Khorasani et al. | ........................ | 379/112.01 |
| 2004/0032857 A1 * | 2/2004 | Tannan | ........................ | 370/351 |
| 2004/0193709 A1 * | 9/2004 | Selvaggi et al. | ............. | 709/224 |
| 2005/0238000 A1 * | 10/2005 | Pollock et al. | ................ | 370/352 |
| 2006/0083170 A1 * | 4/2006 | Silva et al. | .................... | 370/238 |
| 2007/0091807 A1 * | 4/2007 | Yoshikawa | ..................... | 370/232 |
| 2007/0232237 A1 * | 10/2007 | Croak et al. | .............. | 455/67.14 |

* cited by examiner

*Primary Examiner* — Ricky Ngo
*Assistant Examiner* — Dewanda Samuel (57) ABSTRACT

The invention comprises a method and apparatus for analyzing a network. Specifically, the method comprises receiving information associated with the network, automatically constructing a network representation using the information, and performing at least one network performance test, wherein the at least one network performance test is performed using at least a portion of the network representation.

18 Claims, 6 Drawing Sheets

METHOD AND APPARATUS FOR NETWORK PERFORMANCE ANALYSIS

FIELD OF THE INVENTION

The invention relates to the field of communication networks and, more specifically, to network design simulation and network performance analysis.

BACKGROUND OF THE INVENTION

As service providers continue to deploy and upgrade network infrastructures in support of voice-over-Internet-Protocol (VoIP) traffic, network infrastructures are rapidly becoming more complex. In addition to the potentially large number of deployed network components, the network infrastructures are complex in that IP network components are increasingly being deployed not only in support of IP-to-IP communications, but for interfacing to other networks (such as Publicly Switched Telephone Networks) as well. This situation is exacerbated by use of network components provided by numerous equipment vendors, especially since such network components are still relatively undeveloped with respect to reliability and scale.

In order to analyze proposed network architectures (and associated network components), service providers often design and deploy test networks in order to validate the performance of the proposed network architectures. Unfortunately, due to resource constraints, such test networks are often implemented in a controlled laboratory environment as small-scale versions of the proposed network architecture. The service providers then attempt to extrapolate the network analysis results in order to predict the performance of the full-scale network that the service provider intends to deploy. As such, comprehensive, accurate analysis of the network to be deployed it typically quite difficult.

Furthermore, since modification of an existing test network requires significant effort, design and deployment of test networks substantially limits the ability of service providers to analyze numerous network architectures. Thus, due to the numerous drawbacks and limitations of existing network analysis techniques, accurate knowledge with respect to performance of a particular network is often unattainable until a service provider deploys and operates the proposed network in a live environment. As a result, service providers assume a substantial risk of uncovering customer-impacting network problems in a live network supporting customer traffic.

As such, a need exists in the art for a method and apparatus for analyzing network performance of a representative network architecture prior to deployment of the network architecture for supporting customer traffic.

SUMMARY OF THE INVENTION

In one embodiment, the invention comprises a method and apparatus for analyzing a network. Specifically, the method comprises receiving information associated with the network, automatically constructing a network representation using the information, and performing at least one network performance test, wherein the at least one network performance test is performed using at least a portion of the network representation.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

The invention is discussed in the context of an Internet Protocol (IP) network architecture comprising a plurality of routers and a plurality of user terminals, as well as a PSTN network architecture; however, the methodology of the invention can readily be applied to other network architectures and technologies. An IP network is broadly defined as a network that uses Internet Protocol to exchange data packets. A VoIP network is broadly defined as a network that is capable of carrying voice signals as packetized data over an IP network. A PSTN is broadly defined as a concatenation of circuit-switched telephone systems for carrying voice signals.

In general, the present invention enables a service provider to design a network architecture, and to analyze the performance of the network architecture under specific conditions. As such, the present invention obviates the need for a service provider to expend valuable resources designing a network, and deploying and configuring the associated network equipment, in order to test the performance of various network architectures and associated network functionality.

By enabling a service provider to simulate a particular network architecture without actually deploying a physical network, the present invention affords the service provider significant flexibility in designing and testing numerous potential network architectures while expending minimal resources. As such, the present invention obviates the need for a service provider to assume the risks (e.g., of uncovering customer-impacting network problems in a live network) associated with deploying network architectures that have not been properly tested with respect to call flows, traffic volumes, quality of service parameters, and like network performance conditions.

Figure 1:
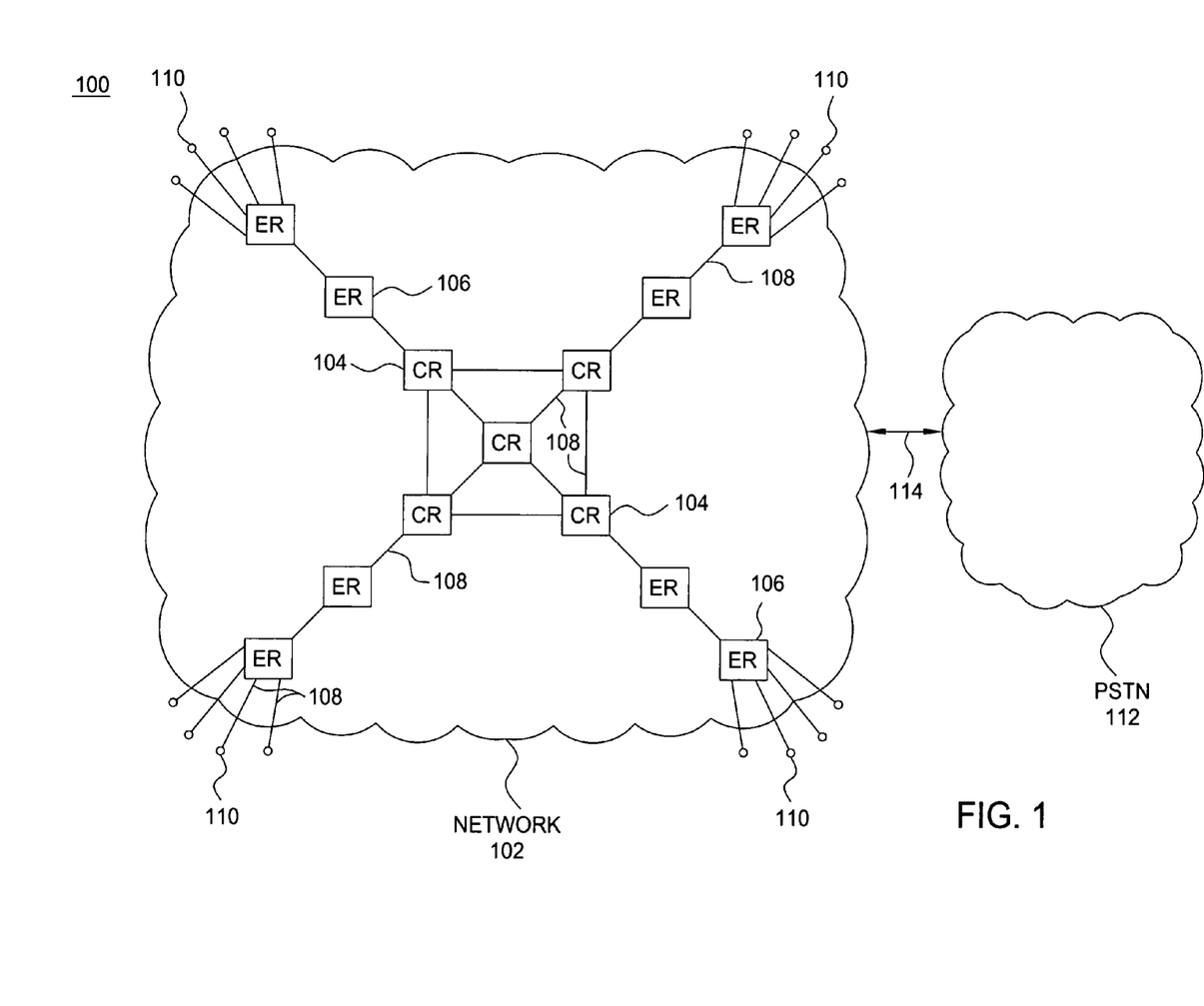
FIG. 1 depicts a high level block diagram of a network architecture comprising an Internet Protocol (IP) network and a Publicly Switched Telephone Network (PSTN)

FIG. 1 depicts a high level block diagram of a network architecture comprising an Internet Protocol (IP) network and a Publicly Switched Telephone Network (PSTN). Specifically, network architecture 100 of FIG. 1 comprises IP network 102 and PSTN 112. As depicted in FIG. 1, IP network 102 and PSTN 112 communicate via communication link 114. Although one communication link 114 is depicted, those skilled in the art will appreciate that additional communication links and associated network equipment (not depicted) and functionality are required in order to facilitate communications between IP network 102 and PSTN 112.

The IP network 102 comprises a plurality of core routers (CRs) 104 (collectively, CR 104), a plurality of edge routers (ERs) 106 (collectively, ER 106), and a plurality of user terminals (UTs) 110 (collectively, UT 110). The CRs 104, ERs 106, and UTs 110 communicate via a plurality of communication links 108. Although numerous CRs, ERs, and UTs are depicted, those skilled in the art will appreciate that an IP network may comprise fewer or more CRs, ERs, and UTs, as well as additional network components. Furthermore, those skilled in the art will appreciate that although UTs 110 are depicted as being directly connected to ERs 106, UTs 110 may communicate with ERs 106 via additional network equipment and associated communication links (not depicted). Although not depicted, PSTN 112 comprises network elements and functionality for supporting circuit-switched services, and is well known in the art.

It should be noted that network architecture 100 is presented as an exemplary network suitable for design and analysis using the methodologies of the present invention. Furthermore, the methodologies of the present invention are not intended to be limited to be used in analyzing the performance of the network type and specific network configuration depicted and described with respect to FIG. 1. As such, the methodologies depicted and described with respect to FIG. 2 and FIG. 3 may be used for network performance analysis of varying network architectures of which network architecture 100 depicted and described herein with respect to FIG. 1 is an example.

Figure 2:
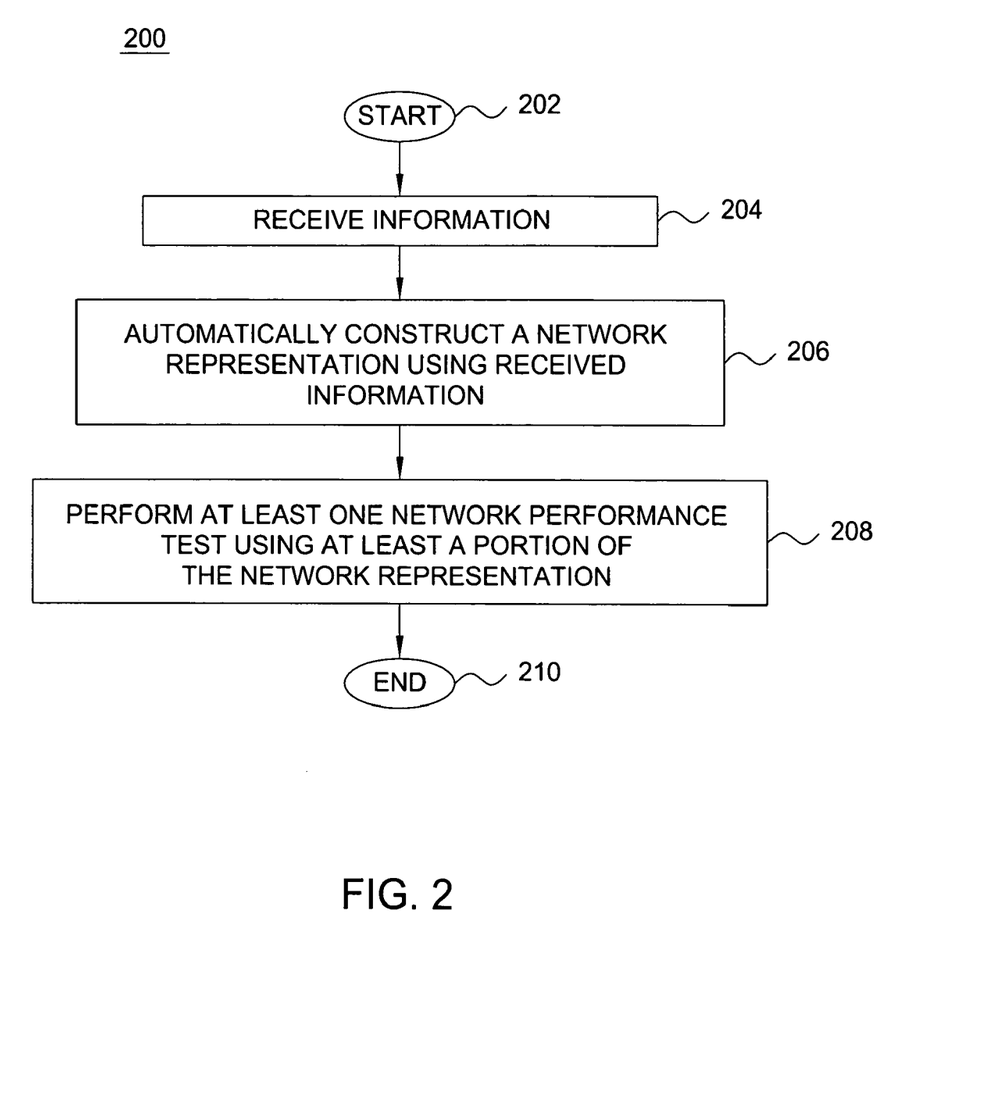
FIG. 2 depicts a flow diagram of a method according to one embodiment of the invention.

FIG. 2 depicts a flow diagram of a method according to one embodiment of the invention. Specifically, method 200 of FIG. 2 comprises a method for analyzing a network. The method 200 is entered at step 202 and proceeds to step 204. At step 204, information associated with the network is received. In one embodiment, the received information may comprise network information useful for constructing a network representation. At step 206, a corresponding network representation is automatically constructed using the received information. In one embodiment, automatic construction may comprise assessing at least one factor. At step 208, at least one network performance test is performed using at least a portion of the network representation. The method 200 then proceeds to step 210 where method 200 ends.

Figure 3:
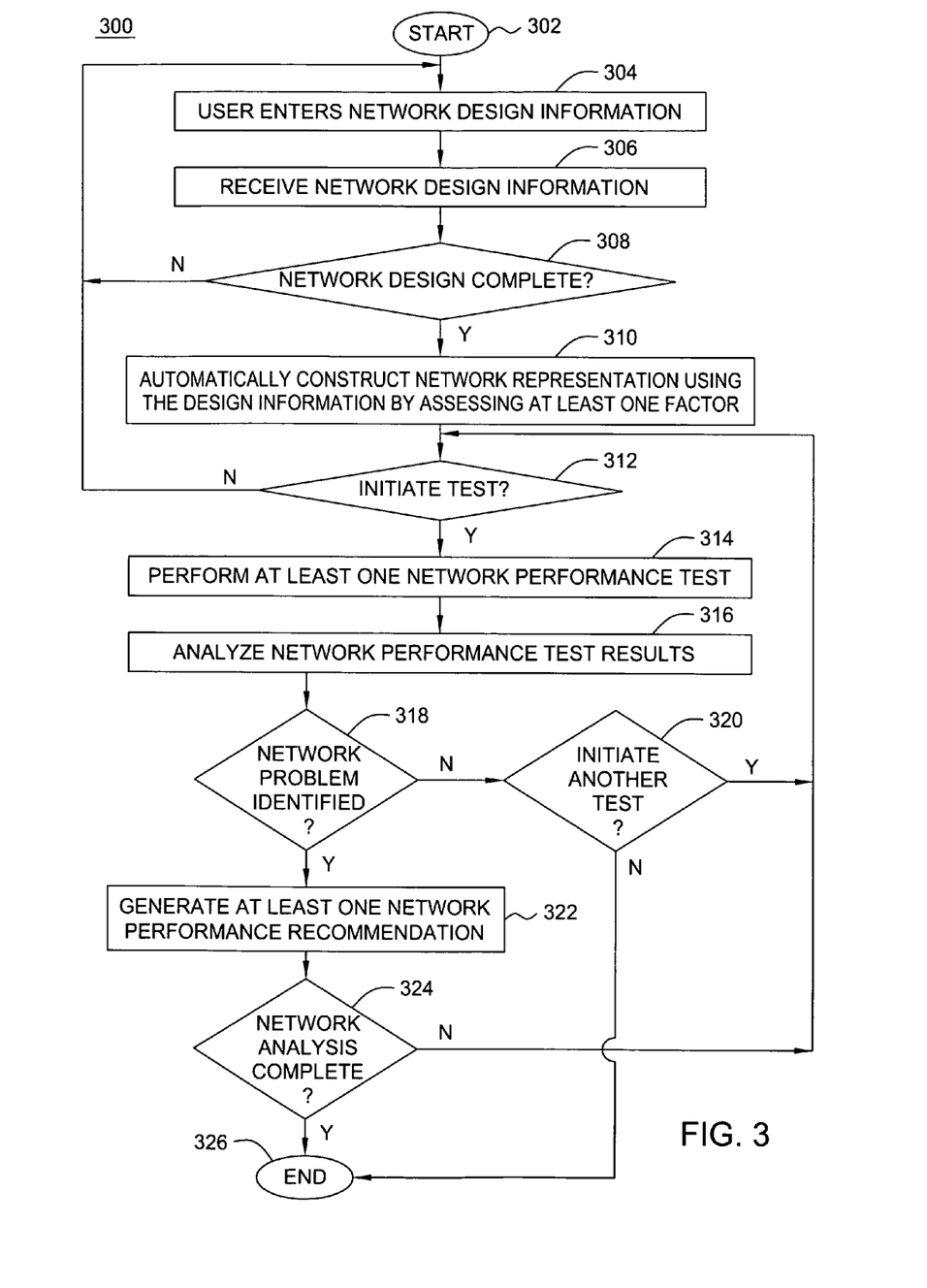
FIG. 3 depicts a detailed flow diagram of the method depicted in FIG. 2.

FIG. 3 depicts a detailed flow diagram of the method depicted in FIG. 2. As such, a single step as depicted in FIG. 2 may correspond to multiple steps as depicted in FIG. 3. Specifically, method 300 of FIG. 3 comprises a method for analyzing a network. Although depicted as being performed serially, those skilled in the art will appreciate that at least a portion of the steps of method 300 may be performed contemporaneously. The method 300 is entered at step 302 and proceeds to step 304.

At step 304, a user enters information associated with a network. In general, the information comprises any information capable of being processed during automatic construction of a logical representation of a physical network. In one embodiment, the entered information comprises network information. For example, network information may comprise geographic location information, network configuration information, network element information, network connectivity information, and like network design information. In another embodiment, the entered information comprises service information and other information useful for constructing a network representation.

In one embodiment, the information entered by the user is selectable via a user interface using information retrieved from at least one database coupled to the user interface. In another embodiment, the information entered by the user may comprise supplemental network design information entered by a user via a user interface (e.g., manually entered network design information not available from a database coupled to the system, such as equipment identifiers, facility identifiers, and the like).

At step 306, the information associated with the network is received and stored. In one embodiment, at least a portion of the information may be received in response to actuation of various entry means via the user interface. In one embodiment, at least a portion of the information associated with the network may be received from at least one remote system. As such, information is received from at least one of a user interface, a local storage medium, a remote storage medium, and the like. The received information is stored in at least one of a memory, database, and like components for storing network design information, as known in the art. In one embodiment, at least a portion of the received information is stored as a portion of a network specification.

At step 308, a determination is made as to whether the network design is complete. In one embodiment, completion of the network design is indicated by a user via the user interface. For example, a user may select a "Network Design Complete" button via the user interface. If the network design is not complete, method 300 returns to step 304, at which point the user may enter additional network design information in order to further define the network specification. If the network design is complete, method 300 proceeds to step 310.

At step 310, a network representation (NR) is automatically constructed using the information entered at step 304 and stored at step 306. In one embodiment, a NR may comprise a logically simulated network on which network performance testing may be simulated with results substantially similar to those obtained by testing the corresponding physical version of that NR. In one embodiment, automatic construction of the network representation may comprise assessing at least one automatic construction factor, such as a call volume, a reliability target, a cost target, a capacity target, a busy-hour call attempt, a subscriber rate, a call model, and like automatic construction factors.

In one embodiment, automatic construction factors may be assessed in order to prioritize the application of the automatic construction factors to the automatic construction of the NR. For example, the reliability target factor may be assigned the highest priority for service providers attempting to deploy an extremely reliable network, while the cost target factor may be assigned a relatively low priority. On the other hand, for example, the cost target may be assigned the highest priority for a service provider attempting to deploy the cheapest possible network, while the call volume factor may be assigned a relatively low priority.

It should be noted that a plurality of automatic construction factors may be assessed during automatic construction of a network representation. For example, call volume may be assessed first, from which a number of core routers and associated edge routers may be determined (e.g., ten core routers and thirty edge routers). The number of core routers and edge routers may be determined using network information, such as network element type and associated vendor-specific equipment information (e.g., using the maximum capacity of a Lucent edge router).

Upon determination of the number of routers required to support that call volume (based on total capacity associated with each of the routers), the reliability target may be assessed next, from which the number of required core routers and edge routers may be modified. Since the call volume assessment assumed maximum loading of the routers, the software (e.g., the network generation module) may determine that in order to meet a reliability target, the routers should be operated at 50% of the total available capacity. As such, the total number of core routers and edge routers may be increased from ten core and thirty edge routers to twenty core and sixty edge routers, respectively.

In continuation of this example, the subscriber rate factor may be assessed next, from which a determination as to the exact placement of the routers may be made. For example, a determination that 10% of projected subscriber traffic originates from a particular geographic region may result in placement of 10% of the access capacity (i.e., six edge routers) in that geographic region. Following assessment of the subscriber rate factor, the cost target may then be assessed in order to determine the most cost-efficient placement of communication links between the core routers and associated edge routers.

Following the coupling of the routers via communication links, the call model may be assessed in order to determine the router configurations required for each of the core routers and edge routers in order to support various call flows and capabilities. As such, by prioritizing at least a portion of the automatic construction factors, and automatically constructing the NR by considering each of the automatic construction factors according to the assigned priority, processing may be performed in order to construct a NR using the received network information.

Although described with respect to specific automatic construction factors, it should be noted that fewer or more automatic construction factors may be used. Similarly, although described above with respect to a specific priority in which the automatic construction factors are assessed, the scope of the present invention is not meant to be limited by the automatic construction factor priority order described in the preceding examples. In one embodiment, automatic construction of the NR may further comprise generating a graphical NR of the network for display to the user via a graphical user interface. In another embodiment, in which the information comprises geographic location information, the graphical NR may overlay a map of the region(s) in which the network is located.

At step 312, a determination is made as to whether a network performance test is initiated. In one embodiment, a network performance test is initiated by a user via the user interface. For example, a user may select an "Initiate Call Flow Test" link from drop-down menu in order to initiate a call flow test on at least a portion of the network representation. In one embodiment, a user may specify at least one network performance test condition associated with the network performance test (such as executing a particular call flow, testing network performance under a specific traffic volume, and like network performance test conditions).

In one embodiment, the network performance test condition entered by the user is selectable using information retrieved from at least one database associated with the user interface. For example, a list of available call flows may be retrieved from a database and adapted for selection from a drop-down menu. If a network performance test is not initiated, method 300 returns to step 304, at which point the user may enter additional network design information in order to further define the network specification. If a network performance test is initiated, method 300 proceeds to step 314, at which point the initiated network performance test is performed.

At step 314, the initiated network performance test is performed. In one embodiment, a network performance test may comprise a test for analyzing the performance of at least a portion of the NR. In one embodiment, the network performance test type (call flow test, network traffic volume test, DMOQ test, and like network performance test types) and associated network performance test conditions (such as executing a particular call flow, testing network performance under a specific traffic load, and like network performance test conditions) may be defined by the user prior to initiation of the network performance test.

At step 316, network performance test results are analyzed. In one embodiment, the network performance test results may be analyzed in order to determine the success of at least one of a call flow test, a traffic volume test, a DMOQ test and like performance tests. For example, call flow test results may be analyzed in order to determine the success of a call flow. Furthermore, the quality of service associated with a call flow may be analyzed in order to identify potential network problems preventing completion of the call flow with a specific quality of service. Similarly, traffic volume test results may be analyzed to determine the effects of supporting a particular traffic volume. For example, the analysis of traffic volume test results may reveal network problems, such as network congestion, network component failures, reduced quality of service, and the like.

At step 318, a determination is made as to whether a network problem has been identified. In one embodiment, identification of a network problem is performed using at least a portion of the network performance test results analyzed in step 316. If a network problem is not identified, method 300 proceeds to step 320, at which point a determination is made as to whether another network performance test is initiated. At step 320, if another network performance test is performed, method 300 returns to step 312, and if another network performance test is not performed, method 300 proceeds to step 326 where method 300 ends. If a network problem is identified at step 318, method 300 proceeds to step 322, at which point at least one associated network performance recommendation is generated.

At step 322, at least one network performance recommendation is generated. In one embodiment, the at least one network performance recommendation is generated in response to at least one of a portion of the network performance results and at least one network problem, either singly or in combination. At step 324, a determination is made as to whether network analysis is complete. If network analysis is not complete, method 300 returns to step 312, at which point a determination is made as to whether another network performance test has to be initiated. If network analysis is complete (e.g., the user plans to designing a new network, has logged out of the application, and the like), method 300 proceeds to step 326 where the method 300 ends.

Although depicted as occurring subsequent to completion of the entry of network design information, those skilled in the art will appreciate that network representation construction step 310 may be performed concurrently with network design information entry steps 304 and 306. In other words, a user is able to obtain a view of the current network design at each step in the network design process, thereby enabling the user to adjust the network design as required. Furthermore, since the network design (network specification) is modifiable at any time, it should be noted that prior to initiation of a network performance test following a network design change, the corresponding network representation may require refinement.

Figure 4:
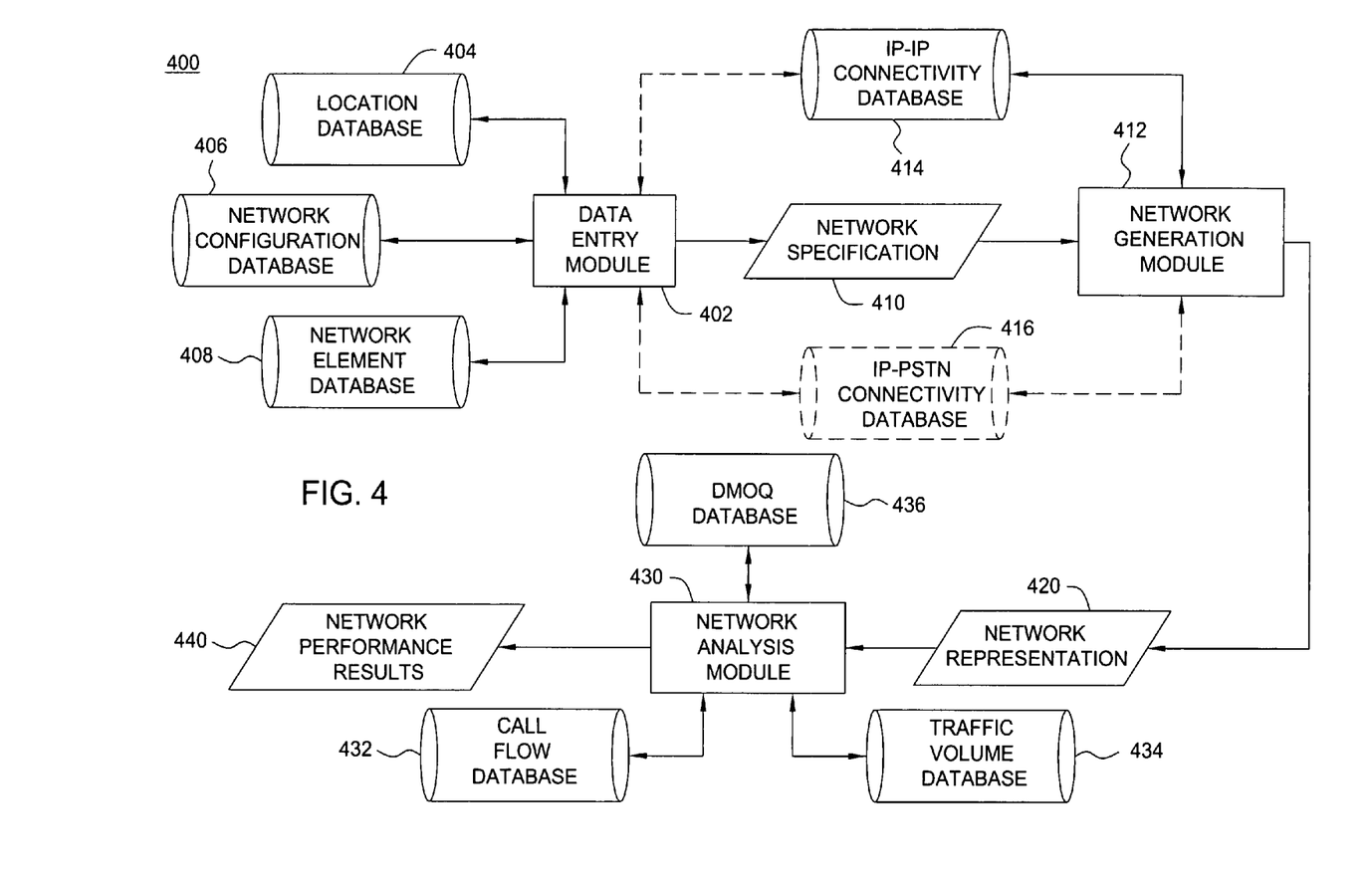
FIG. 4 depicts a high level block diagram of a network analysis module software architecture.

FIG. 4 depicts a high level block diagram of a network analysis module software architecture. In one embodiment, network analysis module software architecture 400 is implemented as network analysis module/process 605, depicted and described herein with respect to FIG. 6. Specifically, network analysis module software architecture 400 of FIG. 4 comprises data entry module (DEM) 402, network generation module (NGM) 412, and network analysis module (NAM) 430. As depicted in FIG. 4, DEM 402 generates network specification (NS) 410, NGM 412 generates network representation (NR) 420, and NAM 430 generates network performance results (NPR) 440.

The DEM 402 accepts input data from location database (LD) 404, network configuration database (NCD) 406, and network element database (NED) 408, either singly or in combination. In one embodiment, the DEM 402 optionally accepts input data from IP-IP connectivity database (IICD) 414 and IP-PSTN connectivity database (IPCD) 416. The DEM 402 receives and processes the network design information and produces corresponding NS 410 that is input to NGM 412. In one embodiment, DEM 402 may accept at least one automatic construction factor as input during generation of the NS 410.

In one embodiment, LD 404 may comprise locations at which network equipment may be placed. For example, such locations may comprise service provider central office locations, existing equipment locations, and like locations. In another embodiment, LD 404 may comprise any location at which network equipment may be placed. For example, the scope of location information available from LD 404 may comprise any geographic locations from virtually any geographic region (such as the World, North America, United States, and the like). In one embodiment, geographic location is identified using at least one of city, state, region, country, continent, and the like.

In one embodiment, NCD 406 may comprise network architecture types, such as full-mesh, partial-mesh, point-to-point, point-to-multipoint, hub-and-spoke, tree, bus, and like network architectures. In one embodiment, NED 408 may comprise network element types, such as customer edge router, provider edge router, provider core router, gateway router, autonomous system border router, and like network element types. In one further embodiment, NED 408 may comprise vendor-specific equipment associated with each of the network element types. For example, vendor-specific equipment such as Cisco 10000 Series Router, Nortel Service Edge Router 5500, and like vendor-specific equipment may be associated with a network element type (e.g., provider edge routers).

In one embodiment, in which the IP network interfaces with a PSTN network (illustratively, IP network 102 and PSTN 112 depicted in FIG. 1), NCD 406 and NED 408 may comprise corresponding PSTN network architecture types and PSTN network element type (and associated vendor-specific equipment), respectively. In this embodiment, DEM 402 accepts PSTN-specific network design data from NCD 406 and NED 408. The PSTN-specific data received by DEM 402, which is well known in the art, is processed for inclusion in the NS 410.

The NS 410 generated by DEM 402 comprises information (i.e., location information, network configuration information, and network element information, and the like) input to DEM 402. In one embodiment, NS 410 comprises at least one of IP-IP and IP-PSTN connectivity information. In other words, NS 410 comprises information required by NGM 412 in order to generate a network representation for use in network performance analysis. It should be noted that since users are provided a capability to continuously define and refine the network design via DEM 402, NS 410 may be dynamically created and modified.

As depicted in FIG. 4, NGM 412 receives NS 410 as input, and receives network connectivity data from IICD 414. In one embodiment, NGM 412 utilizes at least one automatic construction factor, such as a call volume, a reliability target, a cost target, a capacity target, a busy-hour call attempt, a subscriber rate, a call model, and like automatic construction factors. In one embodiment, in which NS 410 comprises both IP and PSTN network information, NGM 412 optionally accepts network connectivity data from IPCD 416. The NGM 412 processes the network connectivity data (associating the network connectivity data to NS 410) and produces a corresponding NR 420 that is input to NAM 430.

In one embodiment, IICD 414 may comprise network element connectivity information associated with communications between IP network elements. In one embodiment, IPCD 416 may comprise network element connectivity information related to communications between IP network elements and PSTN network elements. For example, the IP-IP connectivity and IP-PSTN connectivity information may comprise network element connectivity information such as network element configurations, network element interface types, network element interface configurations, network element port types, network element port configurations, communication link information, and like network element connectivity information.

The NR 420, which may be automatically constructed according to at least one automatic construction factor, comprises information input to DEM 402, supplemented with IP-IP and IP-PSTN connectivity information. As such, NR 420 comprises a complete, simulated version of the network (comprising network element connectivity information) that is input to NAM 430 for network performance analysis. The NAM 430 receives NR 420 as input, and accepts input data from at least one of call flow database (CFD) 432, traffic volume database (TVD) 434, and DMOQ database (DMOQD) 436. The NAM 430 processes the input data and produces the NPR 440. The NPR 440 may comprise at least one of performance test results, network performance problems, and network performance recommendations.

In one embodiment, NPR 440 may comprise call flow test results associated with executing call flows against NR 420. For example, with respect to FIG. 1, call flow tests may be executed against any combination of network elements including CRs, ERs, and UTs, as well as other network components (not depicted). In one embodiment, the performance test results may comprise traffic volume test results associated with simulating specific traffic volumes on at least a portion of the NR 420. In another embodiment, the performance test results may comprise DMOQ results (e.g., whether or not a specific DMOQ was achieved by NR 420 in response to at least one of call flow testing, traffic volume testing, and like network testing).

In one embodiment, NPR 440 may comprise network performance problems. For example, NPR 440 may comprise network performance problems such as network problems (call flow failures, network congestion points, DMOQ problems, and the like), network element problems (configuration, interface, and port failures, failover problems, and the like), network communication link problems (insufficient capacity, communication link failures, and the like), and like network performance problems.

In one embodiment, NPR 440 may comprise network performance recommendations. For example, NPR 440 may comprise network performance recommendations such as modifying network capacity, modifying network architecture, modifying network element type, modifying network element configuration, modifying network element capacity, adding network elements, removing network elements, adding/removing communication links, increasing network redundancy, modifying call flows, and like network performance recommendations.

It should be noted that, using the methodologies of the present invention, various other network performance results, network performance problems, and network performance recommendations associated with IP and IP-PSTN networks may be identified and adapted for display. Furthermore, although described with respect to IP and IP-PSTN network configurations, those skilled in the art will appreciate that at least a portion of the network performance results that may be generated and displayed varies depending upon the network type designed and analyzed according to the present invention.

It is contemplated by the inventors that at least a portion of the described functions may be combined into fewer functional elements/devices. For example, although depicted as distinct modules, those skilled in the art will appreciate that the functionality of DEM 402, NGM 412, and NAM 430 may be implemented as a single module. Furthermore, those skilled in the art will appreciate that DEM 402 and NGM 412 may operate concurrently such that NS 410 and NR 420 are generated contemporaneously. It should be noted that in this embodiment, NS 410 and NR 420 may optionally be generated as a single output. Similarly, it is contemplated by the inventors that various functions may be performed by other functional elements or that the various functions may be distributed across the various functional elements in a different manner.

Although depicted as distinct databases, those skilled in the art will appreciate that at least a portion of LD 404, NCD 406, NED 408, IICD 414, IPCD 416, CFD 432, TVD 434, and DMOQD 436 may be combined, separated, rearranged, and stored in fewer or more databases, retrieved from at least one remote database, stored in at least one memory component (RAM, ROM, and like memory components), and the like. Furthermore, although not depicted, it should be noted that additional connectivity databases may be utilized for analysis of hybrid networks comprising various combinations of technologies. For example, analysis of a network in which IP network elements communicate with asynchronous transfer mode (ATM) network elements may be facilitated by an associated IP-ATM connectivity database.

In one embodiment, at least a portion of the information available from GLD 404, NCD 406, NED 408, IICD 414, IPCD 416, CFD 432, TVD 434, and DMOQD 436 is adaptable for display to a user interface. Similarly, it should be noted that at least a portion of NS 410, NR 420, and NPR 440 is adaptable for display to a user. In one embodiment, such information is displayed to a user via a graphical user interface, an example of which is depicted and described herein with respect to FIG. 5.

Figure 5:
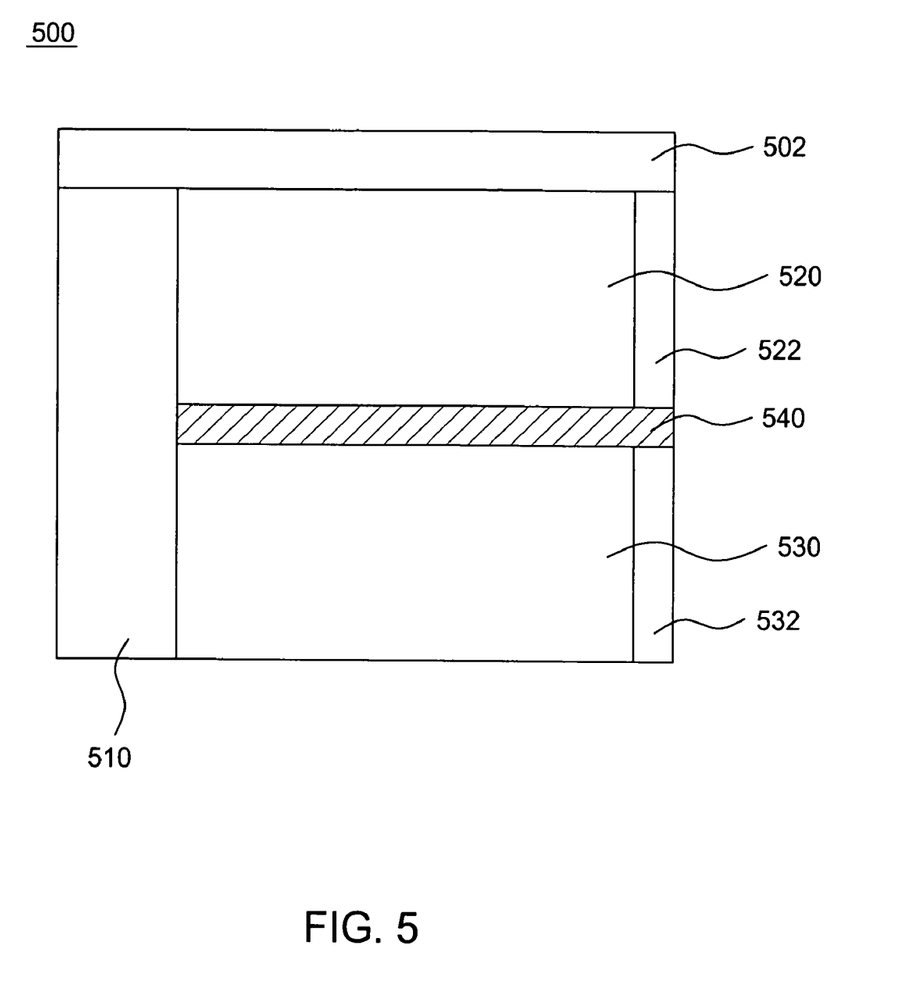
FIG. 5 depicts an exemplary user interface according to the present invention.

FIG. 5 depicts an exemplary user interface according to the present invention. Specifically, exemplary user interface 500 comprises a first toolbar portion 502, a second toolbar portion 510, a network display portion 520, and a network performance results portion 530. The network display portion 520 and network performance results portion 530 comprise respective scroll bars 522 and 532. Furthermore, display window adjustor 540 is adjustable for modifying the respective sizes of network display portion 520 and network performance results portion 530.

The first toolbar portion 502 and second toolbar portion 510 comprise data entry means for entering network design information, and for initiating network performance tests. As such, at least one of first toolbar portion 502 and second toolbar portion 510 may comprise network design information, such as location, network configuration, network element, IP-IP and IP-PSTN connectivity, and like information. Similarly, at least one of first toolbar portion 502 and second toolbar portion 510 may comprise information for initiating network performance tests, such as call flow, traffic volume, DMOQ, and like information.

In one embodiment, for example, location information may be adapted for selection from a drop-down list of existing service provider central office locations. In another embodiment, for example, geographic information (such as a map of the United States, North America, World, and the like) may be displayed in network display portion 520 such that a user may drag-and-drop network elements from at least one of first toolbar portion 502 and second toolbar portion 510 onto network display portion 520.

In one embodiment, the network architectures available from first toolbar portion 502 and second toolbar portion 510 may comprise various network architectures such as full mesh, partial mesh, like network architectures described herein. For example, a network architecture may be selectable via a drop-down list, by selecting a radio-button and associated "Submit" button, and like means of selecting and submitting information via a graphical user interface. In another embodiment, for example, at least one additional window may be opened in which a user may design a specific network architecture for display in network display portion 520.

In one embodiment, the network elements available from first toolbar portion 502 and second toolbar portion 510 may comprise various network element types and vendor-specific network elements. For example, a user may first select a network element type (such as customer edge router, provider edge router, provider core router, gateway router, ASBR, and like network element types) from a first drop-down list. Upon selection of the network element type from the first drop-down list, a second drop-down list of corresponding vendor-specific equipment within that category is populated, enabling the user to select vendor-specific network elements.

In one embodiment, at least a portion of NS 410 output from DEM 402 (input by a user via the first toolbar portion 502 and second toolbar portion 510) is displayed in network display portion 520. Using the first toolbar portion 502 and second toolbar portion 510, a user may then supplement NS 410 with network connectivity information. The network connectivity information further defines the network such that communication between network elements within NS 410 is sufficiently defined to form a complete representation of the network (illustratively, NR 420).

In one embodiment, NR 420 is displayed in network display portion 520, and details associated with NR 420 may be accessed via network display portion 520. For example, a user may be provided with drill-down capabilities such that by double-clicking a network element, communication link, and like network components, additional information associated with the network component is displayed to the user. In another embodiment, for example, a user may highlight at least one network component and select an action (e.g., "view additional information") from at least one of the first toolbar portion 502 and the second toolbar portion 510.

At least a portion of the network performance tests described herein may be initiated via exemplary user interface 500. In one embodiment, for example, a user may select a call flow to execute on the network displayed in network display portion 520. In another embodiment, a user may select a traffic volume to apply to the network displayed in network display portion 520. In another embodiment, a user may select at least one DMOQ to test with respect the network displayed in network display portion 520. In such embodiments, the call flow, traffic volume, and DMOQ tests and associated test parameters may be selected and executed from at least one of the first toolbar portion 502, second toolbar portion 510, and network display portion 520.

In one embodiment, network performance results are displayed in at least one of network display portion 520 and network performance results portion 530. For example, a call flow test failure resulting from an incorrect network element configuration may be communicated to a user by causing the affected network element in network display portion 520 to flash, and by displaying associated call flow test results in network performance results portion 530. Similarly, a traffic volume test failure resulting from inadequate network capacity may be communicated to a user by causing the affected communication link in network display portion 520 to flash, and by displaying associated traffic volume test results (such as current network capacity and additional network capacity required to prevent the failure condition) in network performance results portion 530. Similar means of communicated associated DMOQ test results may be employed.

Although specific embodiments and examples have been described, it should be noted that information associated with DEM 402, NS 410, NGM 412, NS 420, NAM 430 and NPR 440 may be displayed in at least one of first toolbar portion 502, second toolbar portion 510, network display portion 520, and network performance results portion 530. Furthermore, although described with respect to various means of viewing, selecting, and submitting information, those skilled in the art will appreciate that the means of viewing, selecting, and submitting information may vary based on user interface design, network type, and like parameters. As such, design, construction, and analysis of networks using the methodologies of the present invention may vary based on user interface design, network type, and like parameters.

Figure 6:
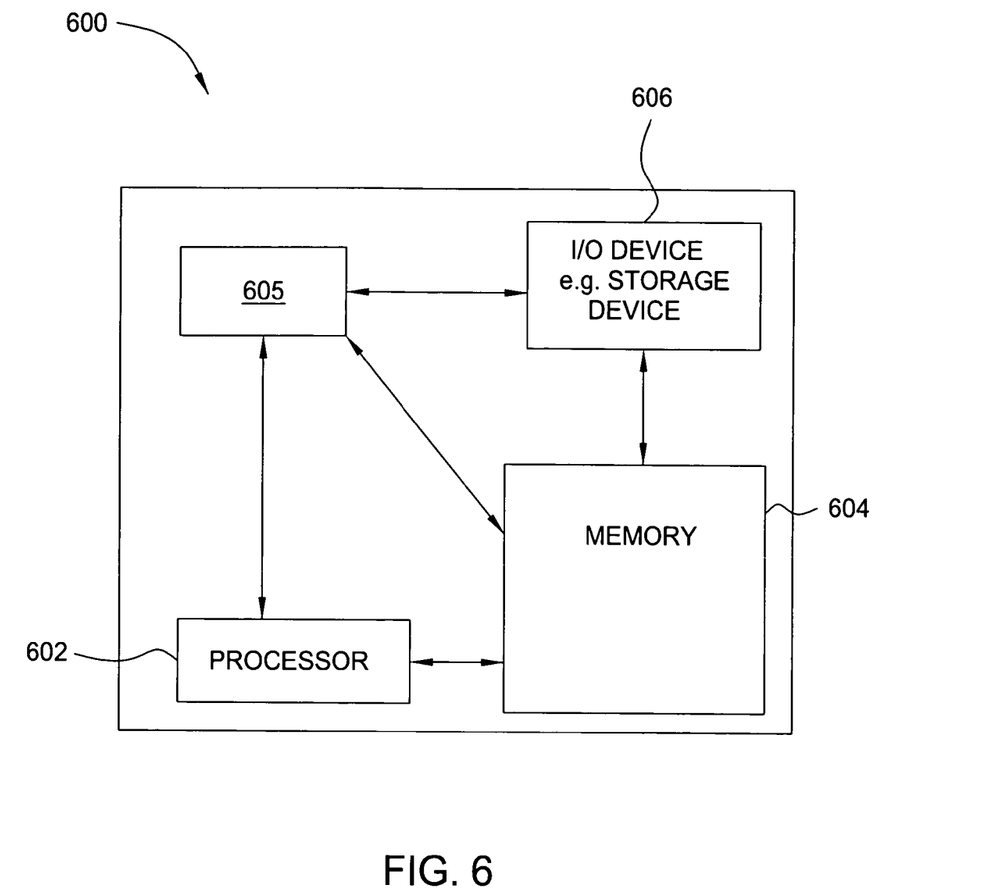
FIG. 6 depicts a high level block diagram of a general purpose computer suitable for use in performing the functions described herein.

FIG. 6 depicts a high level block diagram of a general purpose computer suitable for use in performing the functions described herein. As depicted in FIG. 6, the system 600 comprises a processor element 602 (e.g., a CPU), a memory 604, e.g., random access memory (RAM) and/or read only memory (ROM), a network performance analysis module 605, and various input/output devices 606 (e.g., storage devices, including but not limited to, a tape drive, a floppy drive, a hard disk drive or a compact disk drive, a receiver, a transmitter, a speaker, a display, an output port, and a user input device (such as a keyboard, a keypad, a mouse, and the like)).

It should be noted that the present invention can be implemented in software and/or in a combination of software and hardware, e.g., using application specific integrated circuits (ASIC), a general purpose computer or any other hardware equivalents. In one embodiment, the present network performance analysis module or process 605 can be loaded into memory 604 and executed by processor 602 to implement the functions as discussed above. As such, the present network performance analysis process 605 (including associated data structures) of the present invention can be stored on a computer readable medium or carrier, e.g., RAM memory, magnetic or optical drive or diskette and the like.

Although depicted and described herein with respect to an IP network and associated IP network elements and functionality, it should be noted that the network design, construction, and testing methodologies of the present invention may be applied to various other networks and network technologies. In such embodiments, network configuration, network element, connectivity, call flow, traffic volume, DMOQs, and like technology-specific and network-specific information may vary according to the type of network designed, constructed, and analyzed using the methodologies of the present invention.

Although various embodiments which incorporate the teachings of the present invention have been shown and described in detail herein, those skilled in the art can readily devise many other varied embodiments that still incorporate these teachings.

What is claimed is:

1. A method for analyzing a network, comprising:
receiving information associated with the network;
automatically constructing a network representation using the information, wherein the network representation is a logically simulated network, wherein the automatically constructing comprises:
assigning a highest priority to one of a plurality of construction factors, wherein the plurality of construction factors comprises a reliability target, a call volume, a cost target, a capacity target, a subscriber rate, and a call model, wherein the highest priority of the one of the plurality of construction factors is a higher priority over any other construction factors; and
constructing the network representation in accordance with the highest priority of the one of the plurality of construction factors; and
performing a network performance test, wherein the network performance test is performed using a portion of the network representation.

2. The method of claim 1, wherein the information comprises internet protocol network information.

3. The method of claim 1, wherein the information comprises internet protocol network information and publicly switched telephone network information.

4. The method of claim 1, wherein internet protocol information comprises network configuration information.

5. The method of claim 1, wherein the network representation is displayed via a user interface.

6. The method of claim 1, wherein the network performance test comprises a call flow test.

7. The method of claim 1, further comprising:
identifying a network performance problem in response to the network performance test.

8. The method of claim 7, wherein the network performance problem is displayed via a user interface.

9. The method of claim 1, further comprising:
generating a recommendation in response to the network performance test.

10. The method of claim 9, wherein the recommendation comprises, a network architecture modification.

11. A non-transitory computer readable storage medium encoded with a computer program, that, when executed by a computer, causes the computer to perform a method comprising:
receiving information associated with the network;
automatically constructing a network representation using the information, wherein the network representation is a logically simulated network, wherein the automatically constructing comprises:
assigning a highest priority to one of a plurality of construction factors, wherein the plurality of construction factors comprises a reliability target, a call volume, a cost target, a capacity target, a subscriber rate, and a call model, wherein the highest priority of the one of the plurality of construction factors is a higher priority over any other construction factors; and
constructing the network representation in accordance with the highest priority of the one of the plurality of construction factors; and performing a network performance test, wherein the network performance test is performed using a portion of the network representation.

12. The non-transitory computer readable storage medium of claim 11, wherein the information comprises internet protocol network information.

13. The non-transitory computer readable storage medium of claim 11, wherein internet protocol information comprises network configuration information.

14. The non-transitory computer readable storage medium of claim 11, wherein the network representation is displayed via a user interface.

15. The non-transitory computer readable storage medium of claim 11, wherein the network performance test comprises a call flow test.

16. The non-transitory computer readable storage medium of claim 11, further comprising:
    identifying a network performance problem in response to the network performance test.

17. The non-transitory computer readable storage medium of claim 11, further comprising:
    generating a recommendation in response to the network performance test.

18. An apparatus for analyzing a network, comprising:
    means for receiving information associated with the network;
    means for automatically constructing a network representation using the information, wherein the network representation is a logically simulated network, wherein the constructing means assigns a highest priority to one of a plurality of construction factors, wherein the plurality of construction factors comprises a reliability target, a call volume, a cost target, a capacity target, a subscriber rate, and a call model, wherein the highest priority of the one of the plurality of construction factors is a higher priority over any other construction factors, and the constructing means constructs the network representation in accordance with the highest priority of the one of the plurality of construction factors; and
    means for performing a network performance test, wherein the network performance test is performed using a portion of the network representation.

\* \* \* \* \*